United States Patent [19]
Hansen et al.

[11] Patent Number: 5,297,648
[45] Date of Patent: Mar. 29, 1994

[54] COMPOUND STEERING MECHANISM

[75] Inventors: Charles A. Hansen; Joseph C. Hurlburt, both of Lancaster, Pa.

[73] Assignee: Ford New Holland, Inc., New Holland, Pa.

[21] Appl. No.: 61,470

[22] Filed: May 17, 1993

[30] Foreign Application Priority Data

Mar. 16, 1992 [EP] European Pat. Off. .......... 92.200743

[51] Int. Cl.⁵ ............................................. B62D 5/00
[52] U.S. Cl. ................................... 180/144; 180/156; 180/79.4; 280/117
[58] Field of Search ............... 180/144, 155, 156, 158, 180/159, 160, 162, 79.3, 79.4, 266, 267; 280/97, 98, 103, 117

[56] References Cited

U.S. PATENT DOCUMENTS

| 1,733,544 | 8/1928 | Langdon | 280/103 |
| 2,788,858 | 4/1957 | Aasland et al. | 180/210 |
| 3,016,987 | 1/1962 | Williamson | 187/9 R |
| 3,027,963 | 4/1962 | Nicholson | 180/144 |
| 3,063,173 | 11/1962 | Wardle | 180/266 |
| 3,370,670 | 2/1968 | Love | 180/144 |
| 4,771,851 | 9/1988 | Nystuen | 180/135 |
| 5,046,577 | 9/1991 | Hurlburt | 180/266 |
| 5,129,477 | 7/1992 | Hurlburt | 180/156 |

FOREIGN PATENT DOCUMENTS

| 1630721 | 8/1967 | Fed. Rep. of Germany . |
| 6170 | 1/1984 | Japan | 180/144 |
| 8907545 | 8/1989 | PCT Int'l Appl. . |

Primary Examiner—Margaret A. Focarino
Assistant Examiner—Kevin T. Hurley
Attorney, Agent, or Firm—Larry W. Miller; Frank A. Seemar

[57] ABSTRACT

A steering mechanism for a tractor having a transverse axle with pivotally movable steering wheels and a laterally shiftable chassis is disclosed wherein a first tie rod interconnects the steering arms of the opposing steerable wheels to couple the movements thereof and a second tie rod interconnects the chassis and the first tie rod to couple the laterally shifting movements of the chassis to the pivotal movements of the steerable wheels. The second tie rod is selectively re-positionable to the transverse axle to disassociate the lateral shifting movements of the chassis from the pivotal movements of the steerable wheels, thereby allowing a selection between a compound steering operation and a conventional-type simple steering operation.

14 Claims, 3 Drawing Sheets

COMPOUND STEERING MECHANISM

BACKGROUND OF THE INVENTION

This invention relates generally to a steering mechanism for an agricultural tractor in which the front axle is laterally shiftable in response to a steering movement of the steerable wheels and, more particularly, to a tie rod configuration for controlling the lateral movements of a chassis in response to the pivotal movements of the steerable wheels.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Supplemental driving power is often provided through the steerable ground engaging wheels, while a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse displacement of cylinder rod, causing a turning of the wheels.

Due to physical limitations relating to the range of movement of the steering mechanism and to the eventual interference between the steerable wheels and the steering axle or chassis frame, the amount of pivotal movement of the steerable wheels relative to the steering axle is limited by tire size and track setting to a given restricted turning angle. This maximum turning angle defines the minimum turning radius of the tractor for a given chassis clearance width, axle oscillation angle, wheel base length and king pin spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

These conflicting wheel base requirements can be better resolved by a steering mechanism incorporating a laterally shifting front axle that is movable in response to a corresponding steering movement of the steerable wheels, which will decrease the turning radius of the tractor for any given wheel base length. The steering mechanism must associate the lateral shifting movements of the chassis with the pivotal movements of the steerable wheels. Preferably, the steering mechanism would be convertible from a compound operation, in which the pivotal steering movements of the wheels is coupled to a lateral shifting between the chassis and the transverse axle, and a simple steer operation in which the steering operation is effected in a conventional manner by a mere pivotal movement of the steerable wheels.

SUMMARY OF THE INVENTION

It is an object of this invention to overcome the aforementioned disadvantages of the prior art by providing a tie rod configuration coupling the pivotal movements of the steerable wheels and the lateral shifting of the chassis relative to the transverse axle.

It is another object of this invention to provide a steering mechanism that can be easily converted between a compound steering operation and a conventional simple steering operation.

It is an advantage of this invention that the conversion of the operation of the steering mechanism between compound steer and simple steer can be effected by a relocation of one end of a tie rod.

It is a feature of this invention that the steering mechanism can be converted from a compound steering mode to a simple steering mode by disconnecting one end of a tie rod from its operative connection with the steerable wheels and reconnecting the tie rod end to the transverse axle.

It is another advantage of this invention that the tie rod utilized to couple the lateral shifting of the chassis in response to the pivotal movement of the steerable wheels is connected at one end at the longitudinal centerline of the chassis to prevent any impact to the steering of the tractor as a result of vertical oscillatory motion of the axle relative to the chassis.

It is another feature of this invention that the modifications of a simple steering configuration to convert the steering mechanism to a compound steering configuration are easily accomplished.

It is still another object of this invention to provide a steering mechanism convertible between a compound steering mode and a simple steering mode that is durable in construction, inexpensive of manufacture, carefree of maintenance, facile in assemblage, and simple and effective in use.

These and other objects, features, and advantages are accomplished according to the instant invention by providing a steering mechanism for a tractor having a transverse axle with pivotally movable steering wheels and a laterally shiftable chassis wherein a first tie rod interconnects the steering arms of the opposing steerable wheels to couple the movements thereof and a second tie rod interconnects the chassis and the first tie rod to couple the laterally shifting movements of the chassis to the pivotal movements of the steerable wheels. The second tie rod is selectively re-positionable to the transverse axle to disassociate the lateral shifting movements of the chassis from the pivotal movements of the steerable wheels, thereby allowing a selection between a compound steering operation and a conventional-type simple steering operation.

BRIEF DESCRIPTION OF THE DRAWINGS

The advantages of this invention will become apparent upon consideration of the following detailed disclosure of the invention, especially when taken into conjunction with the accompanying drawings wherein.

DETAILED DESCRIPTION OF THE PREFERRED EMBODIMENT

Figure 1:
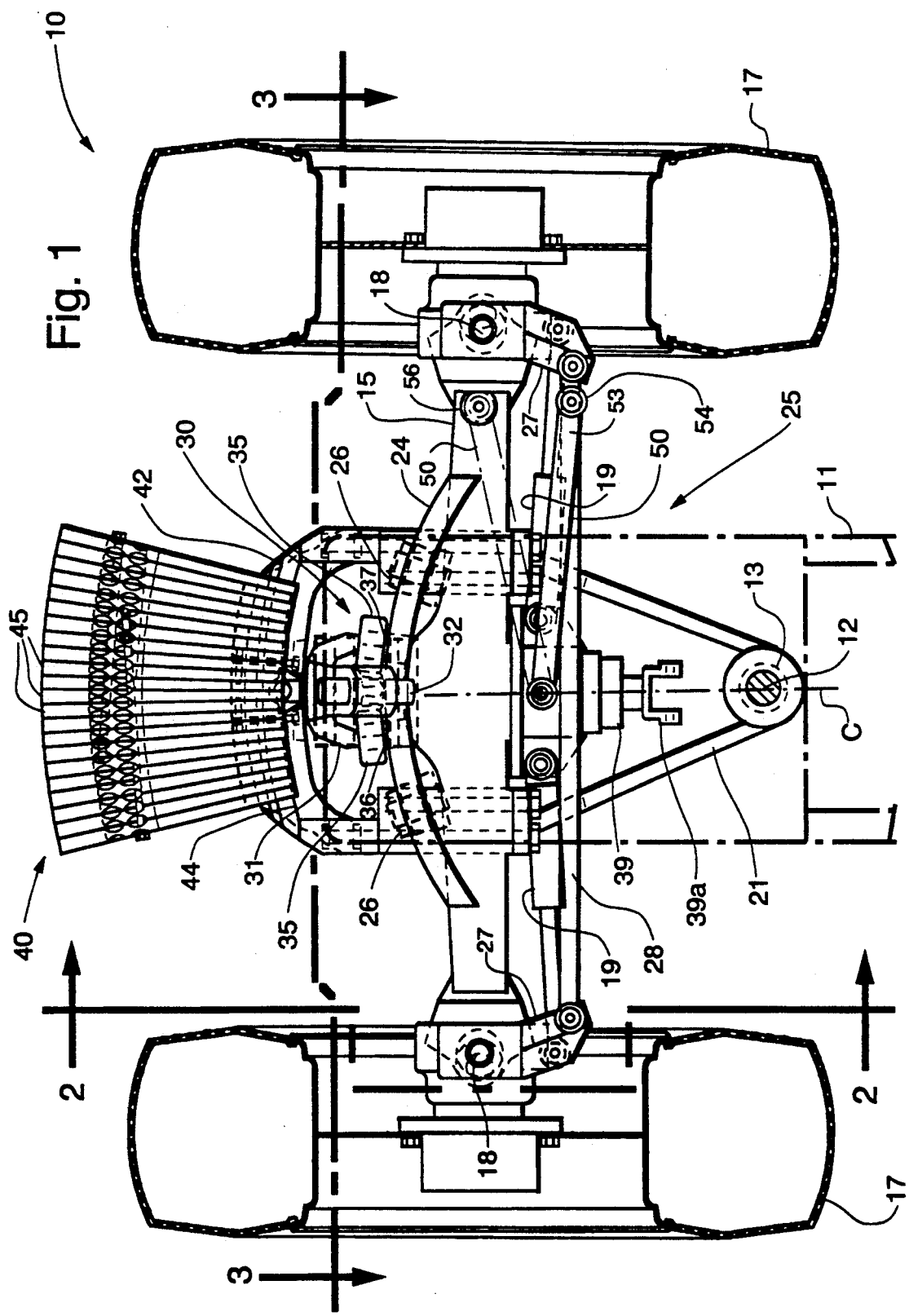
FIG. 1 is a top plan view of a front axle assembly for an agricultural tractor incorporating the principles of the instant invention, the front portion of the tractor chassis overlying the front axle assembly being shown in phantom, the alternative position of the short tie rod to convert the compound steering mechanism to a simple steer mode also being shown in phantom.
Figure 2:
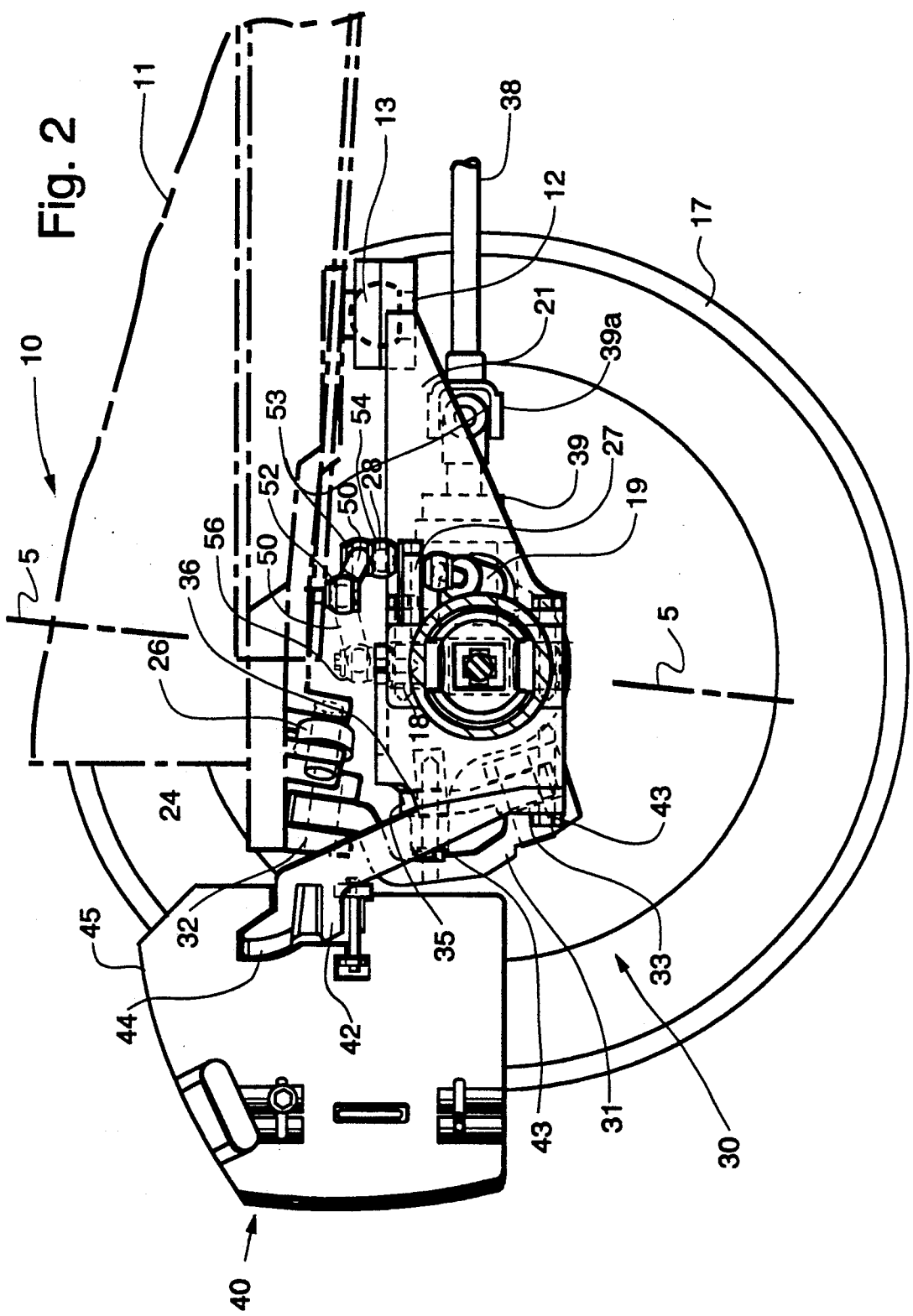
FIG. 2 is a cross-sectional view of the front axle assembly taken along lines 2—2 of FIG. 1, the front portion of the tractor chassis being shown in phantom relative to the front axle assembly, the alternative position of the short tie rod to convert the compound steering mechanism to a simple steer mode also being shown in phantom.
Figure 3:
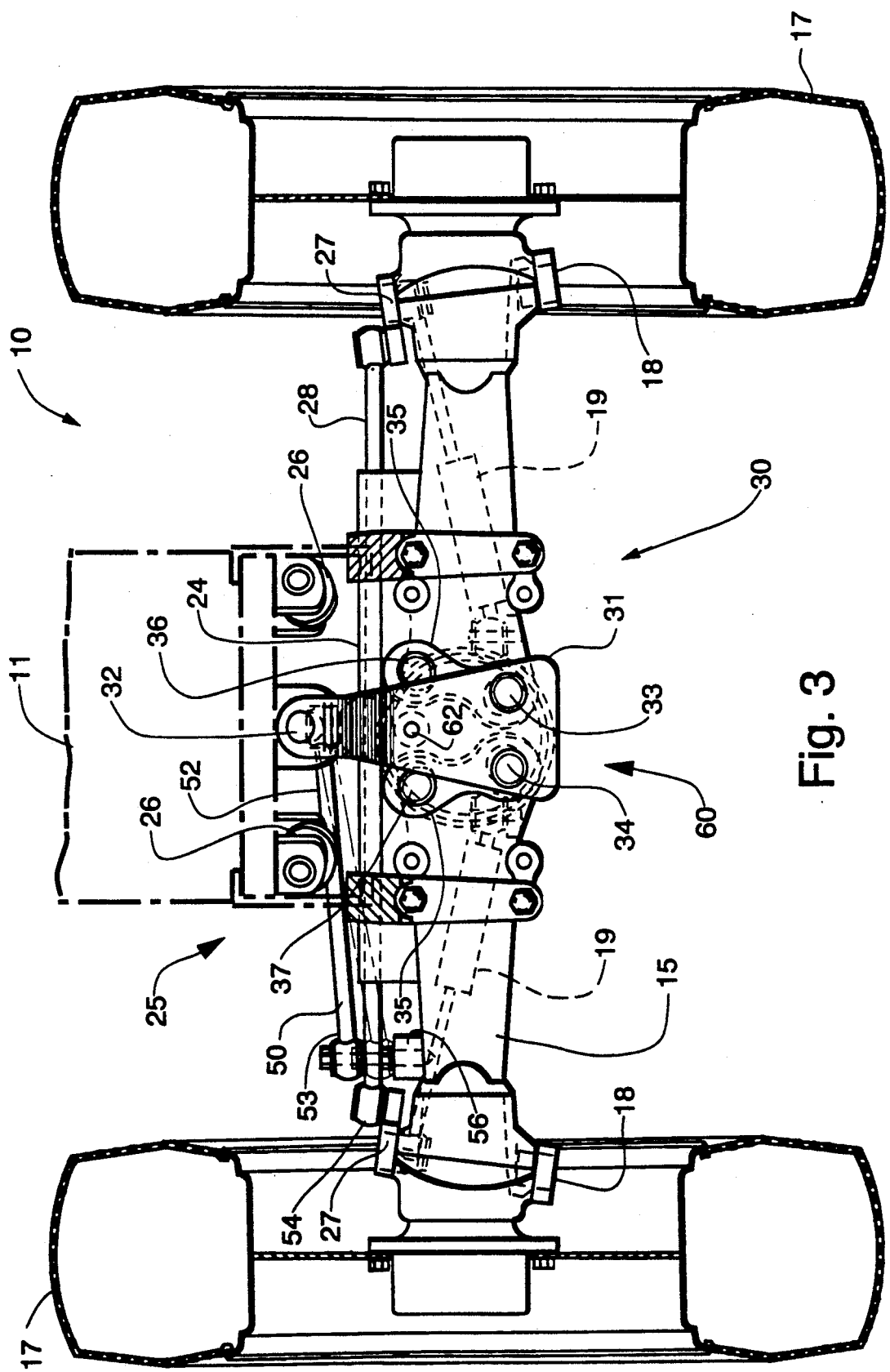
FIG. 3 is a cross-sectional view of the tractor front axle assembly taken along lines 3—3 of FIG. 1 to depict generally a front elevational view of the tractor assembly immediately rearwardly of the weights, the front portion of the tractor chassis being shown in phantom relative to the front axle assembly.

Referring now to FIGS. 1-3, a laterally shifting front axle assembly for an agricultural tractor or other vehicle, pivotally connected to the vehicle chassis to provide a decreased turning radius for an given wheel base, can best be seen. The front axle assembly 10 is pivotally connected to the tractor chassis 11 for pivotal movement about a generally vertical axis 12, thereby allowing the front axle assembly 10 to rotate about the pivot axis 12 and shift the front axle assembly 10 laterally relative to tractor chassis 11. The pivot axis 12 includes a spherical ball joint 13 to permit some oscillatory movement of the front axle 15 relative to the chassis 11. The details of a laterally shiftable front axle assembly to provide better turning capabilities is described in detail in U.S. Pat. No. 5,046,577 issued on Sep. 10, 1991 to Joseph C. Hurlburt, and in U.S. patent application Ser. No. 07/974,652, filed Nov. 12, 1992, by Gilbert W. Linde and Joseph C. Hurlburt, the descriptions of which are incorporated herein by reference.

The front axle assembly 10 includes a transversely extending axle member 15 having pivotally mounted on the respective laterally opposing ends thereof a pair of steerable wheels 17 pivotable about respective nearly vertical king pin axes 18 to effect a steering of the wheels 17 relative to the axle member 15. A pair of hydraulic cylinders 19 interconnect the axle member 15 and the steerable wheels 17 via a steering arm 27 to control the pivotable movement of the wheels 17 relative to the axle member, and thereby, effect steering.

The front axle member 15 carries a rearwardly extending subframe member 21 which carries the vertical pivot 12 and ball joint 13 connected to the tractor chassis 11 rearwardly of the front axle member 15 yet generally positioned laterally between the front steerable wheels 17. A front yoke assembly 30 suspends the laterally shiftable front axle member 15 from the forward end of the tractor chassis 11 to permit a pivotal movement of the front axle assembly 10 relative to tractor chassis 11 about the vertical axis 12. To facilitate relative movement between the front axle assembly 10 and the tractor chassis 11 when the axle is fully oscillated, the front axle member 15 is also provided with an arcuate track 24 having a center of curvature coincident with the pivot axis 12. The chassis 11 carries a pair of laterally spaced rollers 26 that are engageable with the arcuate track 24 when the front axle member 15 oscillates about a generally horizontal axis, extending between the chassis pivot joint 32, described in greater detail below, and the pivot axis 12, in response to changing ground contours and undulations so that the rollers 26 provide a limit to the vertical movement of the front axle member 15 relative to the tractor chassis 11 due to an engagement thereof with the arcuate track 24. One skilled in the art will readily realize that the oscillation axis extending between the chassis pivot 32 and the pivot axis 12 is vertically aligned with the centerline C of the chassis 11, as depicted in FIG. 1., and allows the front axle 15 to oscillate within a generally vertical plane 5 as depicted best in FIG. 2.

A first tie rod 28 interconnects the opposing steering arms 27 to couple the pivotal movements thereof. A second, shorter tie rod 50 has one end 52 attached to the chassis 11 at the longitudinal centerline C and extends to a specially formed mounting point 54 on the first tie rod 28 where the remote second end 53 is connected. One skilled in the art will readily realize that the second end could be mounted substantially anywhere along the pivotally movable steering mechanism 25, including on either of the steering arms 27.

Accordingly, the second tie rod 50 couples the lateral shifting movement of the chassis 11 to the pivotal movement of the steerable wheels 17. As the steerable wheels 17 are pivotally moved relative to the transverse axle 15 by the operation of the hydraulic cylinders 19, the fixed second tie rod 50 transfers the pivotal motion of the wheels 17 via the steering arm 27 and the first tie rod 28 to the chassis 11 to effect a lateral shifting thereof relative to the pivotally connected front axle 15. Although the front axle 15 is pivotally connected to the chassis 11, the front axle 15 is engaged with the ground through the wheels 17 and the actual pivotal movement results in a lateral shifting of the chassis 11. Looking at the front axle 15 from the reference frame of the chassis 11, the appearance is that the axle 15 shifts relative thereto and any reference hereinafter describing the pivotal movement of the front axle member 15 relative to the chassis is so described.

The front yoke assembly 30 has a contoured front carrier member 31 pivotally connected at a second pivot joint 32 to the chassis 11. The front carrier member 31 also carries a pair of transversely spaced third and fourth lower pivots 33, 34, respectively, for pivotally supporting a corresponding pair of dog bone-shaped links 35 which, in turn, are pivotally connected to the front axle member 15 by respective transversely spaced fifth and sixth pivots 36, 37. Each of the pivots 32, 33, 34, 36 and 37 associated with the front yoke assembly 30 have a corresponding pivot axis aligned with the ball joint 13, which is located on the pivot axis 12. Accordingly, the pivot axis for each of the five pivots 32, 33, 34, 36 and 37 have a nonparallel relationship intersecting a common point at the center of the ball joint 13.

As a result, the pivotal movement of the front axle assembly 10 relative to the tractor chassis 11, resulting in a lateral shifting of the front axle member 15, is accomplished through a four-bar linkage which has very little vertical component associated with the movement thereof, yet the chassis 11 maintains a substantially uniform elevation relative to the front axle 15 throughout the range of relative movement between the front steerable axle and the vehicle chassis. The pivot axis for vertical oscillatory movement of the front axle 15 is the axis defined by the second pivot joint 32 extending through the ball joint 13, as both the pivot 32 and the ball joint 13 are fixed relative to the chassis 11. The positioning of the first end 52 of the second tie rod 50 at the longitudinal centerline C of the chassis 11 prevent movements of the axle 15, especially oscillatory movements, from causing any substantial additional steering effect to the axle 15.

As depicted in FIGS. 1-3, the front axle assembly 10 may be powered in a conventional manner from the transmission (not shown) carried by the tractor chassis 11 through the front wheel drive shaft 38 connected to a conventional front wheel drive mechanism 39 to operatively power the rotation of the steerable wheels 17 to facilitate movement of the tractor chassis 11 over the ground. One skilled in the art will readily realize that the provision of a front wheel drive mechanism 39 is optional and independent of the operation of the compound steering mechanism permitting a lateral shifting of the tractor chassis 11 relative to the front axle member 15. The continuous driving of the front wheels 17 during steering operation involving a lateral shifting of the tractor chassis 11 relative to the front axle member 15 can be accommodated by the universal joint 39a interconnecting the front wheel drive mechanism 39 and the drive shaft 38.

The tractor ballast assembly 40 is carried by the front axle assembly 10 intermediate of the steerable wheels 17 at a position centrally therebetween. A carrier 42 is detachably connected by fasteners 43 to the front axle member 15 to extend forwardly thereof and forwardly of the tractor chassis 11, as well. The carrier 42 is provided with an arcuate mounting ring 44 upon which individual suitcase weights 45 are supported. Since the carrier 42 moves with the front axle member 15 relative to the chassis 11, the position of the ballast assembly 40 relative to the laterally spaced front wheels 17 remains relatively fixed, thereby maintaining a substantially constant weight distribution relative to the front wheels 17.

Furthermore, since the ballast assembly 40 moves with the axle member 15, the steering clearance between the pivotally movable wheels 17 and the ballast assembly 40 does not change as the front axle 15 shifts laterally and/or oscillates vertically. As a result, the operator may mount additional weight units 45 to increase the amount of ballast on the front axle 15 without decreasing the tire clearance below that which is acceptable for traditional tractors. Greater detail in the construction and assemblage of the individual weights 45 to form the ballast assembly 40 can be found in co-pending U.S. patent application Ser. No. 07/919,453, the descriptive portions of which are incorporated herein by reference.

The centering of all the pivot axes associated with the pivot joints 32, 33, 34, 36 and 37 at the center of the ball joint 13 allows the unrestricted pivotal movement of the carrier member 31 and the dog-bone link members 35 during the turning movements and for oscillatory or pitching movements as well, without requiring additional motion components to be accommodated during the relative movement of the axle 15 and the chassis 11. It will be understood by one skilled in the art that the specific orientation of these respective pivots 32, 33, 34, 36 and 37 requires the formation of a specially formed carrier member 31 and dog-bone members 35 to orient properly the respective pivots. Furthermore, the carrier member 31 has a somewhat arcuate shape to bow out around the dog-bone members 35 for their unrestricted movement between the carrier member 31 and the axle 15.

To convert the steering mechanism 25 from a compound steering mode, in which the turning of the chassis 11 is accomplished by a combination of a pivotal turning of the wheels 17 and a pivotal movement of the axle 15 relative to the chassis 11, to a simple steering mode, in which turning is accomplished only through operation of the pivoting wheels 17, the second tie rod 50 needs to be disconnected from its mounting 54 on the first tie rod 28 and re-connected to a second mounting connection 56 on the axle 15. As a result, the chassis 11 is fixed to the front axle 15 by the second tie rod 50 and relative movement therebetween is prevented. Furthermore, the disconnection of the second tie rod 50 from the first tie rod 28 eliminates the forces on the chassis 11 to effect a lateral shifting thereof relative to the axle 15.

To further assure that the front axle 15 and the chassis 11 cannot undergo relative movement, a locking apparatus 60, as described in co-pending U.S. patent application Ser. No. 07/974,640, filed on Nov. 12, 1992, by Joseph C. Hurlburt, the descriptive portions of which are hereby incorporated by reference. The locking mechanism 60 consists primarily of a fastener 62 inserted through the front carrier member 31 to engage a corresponding opening in the front axle 15. Since the front yoke assembly 30 cannot pivotally move relative to the front axle 15, there can be no movement of the chassis 11 relative to the axle 15. By repositioning the second tie rod 50 to connect with the axle 15 rather than the first tie rod 28 in conjunction with a subsequent utilization of the locking mechanism 60, the steering mechanism 25 can only operate in a simple steer mode. To re-convert the steering mechanism 25 back into the compound steering mode, the optional locking mechanism 60 would have to be removed (if utilized) and the second tie rod 50 reconnected with the first tie rod 28.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A steering mechanism for a tractor having a chassis; and a transverse axle pivotally supported from said chassis for lateral movement relative thereto, said transverse axle having a pair of steerable wheels pivotally connected by king pins to the opposing transverse ends of said axle, each said steerable wheel having a steering arm associated therewith to effect pivotal movement of the corresponding steerable wheel about the respective king pin, comprising:

a first tie rod having spaced apart ends interconnecting the opposing said steering arms to couple the movements thereof;

a second tie rod having a first end connected to said chassis and a remote second end operatively connected to said steerable wheels so that a pivotal movement of said steerable wheels will effect a movement of said chassis relative to said transverse axle; and actuator means operatively associated with said steerable wheels to power the pivotal movement thereof relative to said transverse axle.

2. The steering mechanism of claim 1 wherein said second end of said second tie rod is selectively connectable to said transverse axle to disassociate the movement of the chassis in response to the pivotal movement of said steerable wheels.

3. The steering mechanism of claim 2 wherein said second end of said second tie rod is selectively connectable between said first tie rod and said transverse axle to control the movement of said chassis relative to the pivotal movement of said steerable wheels.

4. The steering mechanism of claim 3 wherein said first end of said second tie rod is pivotally connected to said chassis along a longitudinal centerline thereof.

5. The steering mechanism of claim 4 wherein said actuator means includes at least one remotely operable hydraulic cylinder interconnecting said transverse axle and a corresponding one of said steerable arms.

6. In a vehicle having a chassis; a transverse axle pivotally supported from said chassis for lateral movement relative thereto, said transverse axle having a pair of steerable wheels pivotally connected by king pins to the opposing transverse ends of said axle, each said steerable wheel having a steering arm associated therewith to effect pivotal movement of the corresponding steerable wheel about the respective king pin; and a steering mechanism operably connected to said steerable wheels to control the pivotal movement thereof relative to said axle for controlling the direction of travel of said vehicle, said steering mechanism including means for effecting relative pivotal movement between said axle and said chassis in response to the pivotal movement of said steerable wheels, an improved steering mechanism comprising:
   a first tie rod having spaced apart ends interconnecting the opposing said steering arms to couple the movements thereof; and
   a second tie rod having a first end connected to said chassis and a remote second end selectively connectable between said steering mechanism and said transverse axle, the connection of said second tie rod to said steering mechanism effecting a pivotal movement of said chassis relative to said transverse axle in response to a pivotal movement of said steerable wheels, while the connection of said second tie rod to said transverse axle fixes the position of said chassis relative to said transverse axle and prevents relative movement therebetween.

7. The vehicle of claim 6 wherein said first end of said second tie rod is pivotally connected to said chassis along a longitudinal centerline thereof.

8. The vehicle of claim 7 wherein said transverse axle is pivotally movable within a generally vertical plane about a longitudinally extending oscillation axis which is vertically aligned with said longitudinal centerline.

9. The vehicle of claim 7 wherein said second end of said second tie rod is connectable to said first tie rod to effect the movement of said chassis relative to said transverse axle in response to the pivotal movement of said steerable wheels.

10. The vehicle of claim 7 further comprising a support linkage pivotally interconnecting said chassis and said transverse axle for support thereof while allowing relative movement therebetween; and a locking means selectively cooperable with said support linkage to fix said chassis to said transverse axle, said locking means being engaged for positionally fixing said chassis to said transverse axle when said second end of said second tie rod is connected to said transverse axle.

11. In a vehicle having a chassis; a transverse axle pivotally supported from said chassis for lateral movement relative thereto, said transverse axle having a pair of steerable wheels pivotally connected by king pins to the opposing transverse ends of said axle, each said steerable wheel having a steering arm associated therewith to effect pivotal movement of the corresponding steerable wheel about the respective king pin; and a steering mechanism operably connected to said steerable wheels to control the pivotal movement thereof relative to said axle for controlling the direction of travel of said vehicle, said steering mechanism including means for effecting relative pivotal movement between said axle and said chassis in response to the pivotal movement of said steerable wheels, an improved steering mechanism comprising:
   a first tie rod interconnecting the opposing said steering arms to couple the movements thereof; and
   a second tie rod interconnecting said chassis and said steering mechanism to couple the pivotal movements of said steerable wheels to said chassis, said second tie rod having a first end pivotally connected to said chassis and a remote second end pivotally connected to said first tie rod, whereby a pivotal movement of said steerable wheels will effect a movement of said chassis relative to said transverse axle.

12. The vehicle of claim 11 wherein said transverse axle is pivotally movable within a generally vertical plane about a longitudinally extending oscillation axis, said first end of said second tie rod being connected to said chassis along said oscillation axis.

13. The vehicle of claim 12 wherein said oscillation axis is vertically aligned with a longitudinal centerline of said chassis.

14. The vehicle of claim 12 wherein said second end of said second tie rod is selectively connectable between said first tie rod and said transverse axle, the connection of said second tie rod to said first tie rod effecting a pivotal movement of said chassis relative to said transverse axle in response to a pivotal movement of said steerable wheels, while the connection of said second tie rod to said transverse axle fixes the position of said chassis relative to said transverse axle and prevents relative movement therebetween.

* * * * *